United States Patent [19]
Dillon

[11] 3,856,473
[45] Dec. 24, 1974

[54] APPARATUS FOR MEASURING $NO_x$ CONCENTRATIONS

[75] Inventor: Glenn W. Dillon, Newton Centre, Mass.

[73] Assignee: Thermo Electron Corporation, Waltham, Mass.

[22] Filed: Feb. 26, 1974

[21] Appl. No.: 445,877

[52] U.S. Cl. .............................. 23/254 E, 250/207
[51] Int. Cl. ...................... G01n 21/26, H01j 39/12
[58] Field of Search ....... 23/254 E, 255 E; 250/232, 250/233, 207

[56] References Cited
UNITED STATES PATENTS

| | | | |
|---|---|---|---|
| 3,734,691 | 5/1973 | Kukla et al. | 23/254 E X |
| 3,749,929 | 7/1973 | Wooten et al. | 23/232 E X |
| 3,763,877 | 10/1973 | Lieb | 23/254 R X |

*Primary Examiner*—Robert M. Reese
*Attorney, Agent, or Firm*—Kenway & Jenney

[57] ABSTRACT

In this apparatus, the concentration of $NO_x$ constituents in a gaseous sample is measured by reacting those constituents with ozone to obtain a chemiluminescent reaction. The ozone is obtained from an electrically energizable ozonator closely coupled to the reaction chamber. By energizing the ozonator periodically, the luminescence obtained in the reaction chamber is caused to pulsate. Accordingly, by measuring the a.c. component of the signal obtained from a photo-detector coupled to the chamber, a measure of $NO_x$ concentration is obtained, this measurement being relatively insensitive to changes to the dark current of the photo-detector.

12 Claims, 1 Drawing Figure

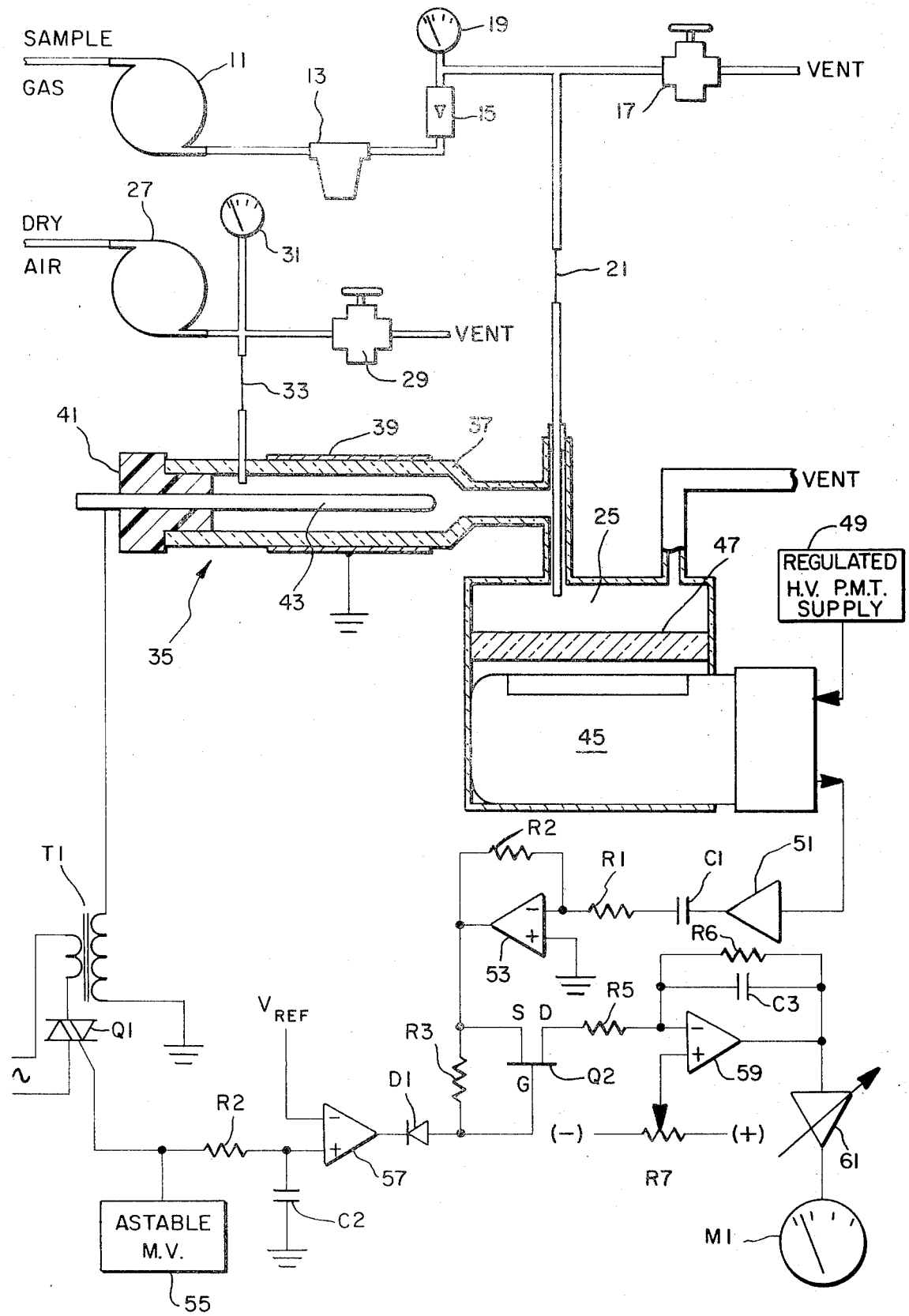

APPARATUS FOR MEASURING $NO_x$ CONCENTRATIONS

BACKGROUND OF THE INVENTION

This invention relates to apparatus for measuring $NO_x$ concentrations and more particularly as to such apparatus providing modulation of the signal of interest. As is known, the concentrations of various $NO_x$ compounds, e.g., nitric oxide and nitrogen dioxide, may be detected by reacting those compounds with ozone. The reactions are chemiluminescent so that, by measuring the light generated in the reaction, a measure of the $NO_x$ concentration may be obtained. Apparatus employing this principle is disclosed in U.S. Pat. No. 3,763,877 which issued on Oct. 9, 1973 to David P. Lieb and which is co-assigned with the present application. Such instruments are useful in pollution and industrial control studies, e.g., for analyzing stack gases.

One problem encountered however, is that the amount of light energy obtained from the chemiluminescent reaction is quite small. Thus, it has been typically necessary to employ a very sensitive and very accurate photo-multiplier tube to be able to measure such luminescence. Further, except in very expensive photo-multiplier tubes, the dark current and system noise due to the photo-multiplier may be relatively large as compared with the signal of interest. These problems can be reduced by optical chopping which modulates the luminescence signal into the a.c. domain. Such chopping, however, typically requires mechanical components which add to the expense of the instrument and increase servicing and reliability problems.

Among the several objects of the present invention may be noted the provision of apparatus for measuring $NO_x$ concentrations by the chemiluminescence method; the provision of such apparatus which is highly accurate which is also reliable and which is of relatively simple and inexpensive construction. Other objects and features will be apparent and, in part, pointed out hereinafter.

SUMMARY OF THE INVENTION

Briefly, apparatus in accordance with the present invention is operative to analyze a gaseous sample flow to measure the concentration of constituents of the flow which react in a chemiluminescent manner with ozone. A continuous flow of the gaseous sample is provided into a sample chamber, the sample chamber being optically coupled to a photo-detector which detects light produced in the chamber and generates a signal responsive thereto. A continuous flow of a reaction gas including oxygen is provided to the chamber through an electrically energizable ozonator. When energized, the ozonator operates to convert at least a portion of the oxygen in the reaction gas to ozone. The ozonator is energized periodically, e.g., in a pulsed mode. By measuring the component of the photo-detector signal which varies periodically with the same frequency as the periodic energization of the ozonator, a measurement is obtained which is indicative of the concentration of the reactive constituent in the gaseous sample.

BRIEF DESCRIPTION OF THE DRAWING

The single drawing is a diagram, partially in schematic form, of $NO_x$ measuring apparatus constructed in accordance with the present invention.

DESCRIPTION OF THE PREFERRED EMBODIMENT

Referring now to the drawing, a sample gas such as effluent stack gas from a generating plant, is drawn into the system by means of a pump 11 and is applied, through a filter 13 and flow-meter 15, to the upstream side of a pressure regulator 17. The downstream side of pressure regulator 17 is vented so that the regulator serves to establish a predetermined upstream pressure, the value of this pressure being indicated on a gauge 19. This controlled pressure produces a predetermined flow through a suitable restriction device, e.g., a capillary tube as indicated at 21. This predetermined flow of the sample gas is then introduced into a reaction chamber 25 described in greater detail hereinafter.

Dry air is drawn into the system by means of a pump 27 which provides this air to the upstream side of a regulator 29. The downstream side of regulator 29 is also vented so that this regulator also serves to create a predetermined pressure at its upstream side, this pressure being indicated by means of a gauge 31. This controlled pressure is employed to establish a predetermined flow of dry air through a suitable restriction device, again a capillary tube as indicated at 33. This measured flow of dry air passes through an ozonator 35 and then into the reaction chamber 25. As will be understood, the ozonated air acts as a reaction gas, reacting in the sample chamber 25 with the $NO_x$ constituents of the sample gas in a chemiluminescent reaction.

As illustrated, ozonator 35 comprises a glass tube 37 having, over a portion of its length, a conductive coating or layer 39 which is electrically grounded. Extending into tube 37, through an insulatng plastic cap 41, is a central electrode 43. The predetermined flow of dry air is introduced at one end of the tube 37, i.e., adjacent the cap 41, and exits at the opposite end having, in the meantime, passed through a region between the central electrode 43 and the grounded conductive sleeve 39.

As will be understood by those skilled in the art, at least a portion of the oxygen in the dry air flow can be converted to ozone by applying a relatively high a.c. voltage to the electrode 43. In the apparatus illustrated, an a.c. potential of about 7,500 volts is selectively applied to electrode 43 by means of a step-up transformer T1 which can be controllably energized from a.c. supply mains through a triac Q1. While a so-called silent discharge type of ozonator has been shown by way of example, it should be understood that other types of electrically energizable ozonator might also be used, such as ultraviolet lamps. Likewise, the ozonator 35 might be energized at frequencies substantially higher than the usual line frequency, i.e., 60 cps.

In accordance with the present invention, the ozonator 35 is periodically and repetitively energized. This is accomplished by operating the triac Q1 under the control of an astable multivibrator 55. Astable multivibrator acts as a free-running electronic oscillator and operates at a frequency of about 0.5 cycles per second with a duty cycle of about 50 percent. The ozonator 35 is thus energized for about 1 second and then deenergized for about 1 second. For reasons which will be apparent hereinafter, this periodicity is selected to correspond with the time required to essentially purge the reaction chamber 25.

Preferably, the reaction chamber 25 is of relatively small volume and the sample gas flow and the reaction gas flow are introduced into the chamber coaxially, as illustrated, so that the chemiluminescent reaction does not begin before the flows actually reach the chamber and so that, once the reaction has taken place, the products of the reaction are relatively quickly vented.

A photo-multiplier tube 45 is optically coupled to the reaction chamber 25 through a filter 47. Filter 47 is selected to pass wave lengths in the region of interest while blocking extraneous wave lengths. A Corning CS 2–64 filter is appropriate. Photo-multiplier tube 45 is energized in conventional manner by a suitable high voltage supply 49 and, as is understood operates to provide a current signal which is essentially proportional to incident light. However, as is also understood, the output signal will comprise a certain level of noise and dark current as well as the signal of interest.

The photo-multiplier tube signal is applied to a buffer amplifier 51 which converts the low level current signal to a voltage signal. This voltage signal is then a.c. coupled, through a capacitor C1, to an amplifier 53 which provides a fixed gain. The gain is determined by the respective values of a pair of resistors R1 and R2 comprising a feed-back network. The amplified a.c. signal is applied to the source terminal of a field-effect transistor Q2 which is operated in a switching mode as a form of synchronous detector.

Conduction through field-effect transistor Q2 is controlled synchronously with the periodic energization of the ozonator 35 in the sense that transistor Q1 is turned on and off at the same frequency, though a delay or phase-shifting is provided. The delay is to compensate for the time required for ozonated air to proceed from the ozonator to the reaction chamber. For this purpose, the signal from the astable multi-vibrator 55 is delayed by means of a network comprising a resistor R2 and a capacitor C2, the resultant signal being applied to a comparator 57 for squaring. A suitable d.c. reference voltage is applied to the other input of comparator 57 to establish the desired switching points. Preferably, the ozonator 35 is located as close as possible to the reaction chamber 25 so as to minimize the delay.

The output signal from comparator 57 is applied to the gate terminal of field-effect transistor Q2 through diode D1. Diode D1 allows the negative-going portions of the output signal from comparator 57 to turn off the transistor Q2. The transistor is normally conducting, being biased by a resistor R3 which connects the gate terminal to the source terminal. As the network comprising resistor R2 and capacitor C2 provides a delay corresponding to the time required for ozonated reaction gas to proceed from the ozonator to the reaction chamber, it can be seen that the transistor Q2 will conduct during the peaks of the signal obtained from the photo-multiplier tube. In other words, the transistor Q2 will be conducting in synchronism with the arrival of the ozonated reaction gas at the reaction chamber and thus in synchronism also with the peak luminescence.

The synchronous detection or rectification of the a.c. component of the photo-detector signal provides a pulsating d.c. signal at the drain terminal of transistor Q2. This pulsating d.c. signal is applied to an amplifier 59 which provides a gain determined by feedback resistors R5 and R6 and which also provides a filtering and integration function by means of an integrating capacitor C3 in the feedback path. The output signal from amplifier 59 thus comprises a steady d.c. voltage essentially proportional to the amplitude of the pulsating component in the original signal obtained from the photo-multiplier tube. An adjustable voltage, obtained by means of a potentiometer R7, is applied to the non-inverting input of amplifier 59 so as to provide an adjustable zero set.

The output signal from the amplifier 59 is applied to a meter M1 through a buffer amplifier 61. The gain of amplifier 61 is preferably adjustable, as indicated, to permit changing the effective range of the instrument. Other types of output indications, e.g., digital or output recording may also be used, as will be understood by those skilled in the art.

As indicated previously, the output signal of the instrument is proportional to the pulsating component in the luminescence detected by the photo-multiplier tube 45 and is thus also essentially proportional to the concentration of $NO_x$ in the sample gas. Further, since only the pulsating component of the luminescence is detected and displayed and since this detection is synchronous with the periodic providing of ozone to the reaction chamber, it can be seen that the output reading is quite insensitive to variations in the dark current of the photo-multiplier tube or to any other components of system noise which are not synchronous with the periodic energization of the ozonator. Accordingly, a relatively inexpensive side-viewing photo-multiplier tube may be used instead of an expensive precision photo-multiplier which must be selected for its stable dark current characteristics. As will be understood, an advantage of using an electrically energized ozonator to effect modulation in this way is that no mechanical valves or optical chopping mechanisms are required.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for analyzing a gaseous sample flow to measure the concentration of a constituent of the flow which reacts in a chemiluminescent manner with ozone, said apparatus comprising:

a sample chamber;

photodetector means for detecting light in said chamber and generating a signal which is responsive thereto;

means for providing a continuous flow of the gaseous sample into the chamber;

means for providing a continuous flow of a reaction gas including oxygen;

means, including an electrically energizable ozonator, for coupling the flow of reaction gas to said chamber for reaction with the sample gas flow, said ozonator being operative, when energized, to convert at least a portion of the oxygen in said reaction gas flow to ozone;

means for periodically energizing said ozonator; and means for measuring the component of the photodetector signal which varies periodically with the same frequency as the periodic energization of said ozonator, the measurement so obtained being indicative of the concentration of the reactive constituent in the gaseous sample.

2. Apparatus as set forth in claim 1 wherein said photodetector means comprises a photomultiplier.

3. Apparatus as set forth in claim 1 wherein said ozonator is of the silent discharge type.

4. Apparatus as set forth in claim 1 wherein said reaction gas is dry air.

5. Apparatus as set forth in claim 1 wherein the frequency of energization of said ozonator is about 0.5 cycles per second.

6. Apparatus as set forth in claim 1 wherein said ozonator is energized by a step-up transformer driven from a.c. mains through a triac and wherein conduction through said triac is controlled by a timer.

7. Apparatus as set forth in claim 6 wherein said timer is a free-running electronic oscillator.

8. Apparatus as set forth in claim 1 wherein said measuring means comprises a synchronous detector.

9. Apparatus as set forth in claim 8 wherein said synchronous detector is provided with a timing signal which is delayed with respect to the periodic energization of said ozonator.

10. Apparatus for analyzing a gaseous sample to measure the concentration of $NO_x$ compounds, said apparatus comprising:
   a sample chamber;
   a photomultiplier for detecting light produced in said chamber and generating a signal which is responsive thereto;
   means for providing a continuous flow at a predetermined rate of the gaseous sample into the chamber;
   means for providing a continuous flow of air at a predetermined rate;
   means including an electrically energizable ozonator for converting at least a portion of the oxygen in the air flow to ozone, the flow from said ozonator being coupled into said reaction chamber;
   timing means for periodically energizing said ozonator; and
   detector means controlled by said timing means for measuring the component of the photodetector signal which varies periodically with the same frequency as the periodic energization of said ozonator, the measurement so obtained being indicative of the concentration of $NO_x$ compounds in the gaseous sample.

11. Apparatus as set forth in claim 10 wherein said timing means includes a free-running electronic oscillator.

12. Apparatus as set forth in claim 11 wherein said detector means comprises a synchronous detector and wherein the signal obtained from said oscillator is delayed to provide a reference signal for said synchronous detector.

* * * * *